(12) United States Patent
Lee et al.

(10) Patent No.: US 9,593,768 B2
(45) Date of Patent: *Mar. 14, 2017

(54) POWER TRANSMISSION APPARATUS FOR HYBRID ELECTRIC VEHICLE

(71) Applicant: Hyundai Motor Company, Seoul (KR)

(72) Inventors: Kyeonghun Lee, Seoul (KR); Jongsool Park, Hwaseong-si (KR); Suengho Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 196 days.

This patent is subject to a terminal disclaimer.

(21) Appl. No.: 14/535,865

(22) Filed: Nov. 7, 2014

(65) Prior Publication Data

US 2015/0167803 A1    Jun. 18, 2015

(30) Foreign Application Priority Data

Dec. 18, 2013 (KR) .......... 10-2013-0158816

(51) Int. Cl.
*F16H 61/04* (2006.01)
*B60K 6/547* (2007.10)
(Continued)

(52) U.S. Cl.
CPC .......... *F16H 61/0403* (2013.01); *B60K 6/365* (2013.01); *B60K 6/48* (2013.01); *B60K 6/547* (2013.01); *F16H 3/006* (2013.01); *B60K 2006/4816* (2013.01); *B60K 2006/4841* (2013.01); *F16H 2003/008* (2013.01); *F16H 2003/0931* (2013.01);
(Continued)

(58) Field of Classification Search
CPC ..... F16H 61/0403; F16H 3/006; B60K 6/365; B60K 6/48; B60K 6/547
See application file for complete search history.

(56) References Cited

U.S. PATENT DOCUMENTS

| 7,225,696 B2 | 6/2007 | Gitt |
| 7,604,565 B2 | 10/2009 | Lee et al. |

(Continued)

FOREIGN PATENT DOCUMENTS

| JP | 4361794 B2 | 8/2009 |
| JP | 4566199 B2 | 8/2010 |

(Continued)

*Primary Examiner* — Jacob S Scott
(74) *Attorney, Agent, or Firm* — Morgan, Lewis & Bockius LLP (57) ABSTRACT

A power transmitting apparatus may include a first input shaft to selectively receive torque of an engine, a second input shaft having at least one input gear fixedly disposed thereon, a third input shaft having at least one input gear fixedly disposed thereon, a motor/generator operated as a motor or a generator, a planetary gear set including a first rotation element directly connected to the motor/generator, a second rotation element directly connected to the third input shaft, and a third rotation element directly connected to the first input shaft, a first speed output unit to convert torque input from the second input shaft or the third input shaft and output the converted torque, and a second speed output unit to convert torque input from the second input shaft or the third input shaft and output the converted torque.

18 Claims, 2 Drawing Sheets (51) Int. Cl.
*F16H 3/00* (2006.01)
*B60K 6/365* (2007.10)
*B60K 6/48* (2007.10)
*F16H 3/093* (2006.01)

(52) U.S. Cl.
CPC ............... *F16H 2200/0056* (2013.01); *F16H 2200/2005* (2013.01); *Y02T 10/6221* (2013.01); *Y02T 10/6256* (2013.01); *Y10S 903/919* (2013.01)

(56) References Cited

U.S. PATENT DOCUMENTS

| | | |
|---|---|---|
| 8,499,656 B2 | 8/2013 | Ross et al. |
| 9,180,872 B2 | 11/2015 | Lee et al. |
| 9,273,757 B2 | 3/2016 | Michel et al. |
| 9,297,443 B2 | 3/2016 | Lee et al. |
| 2006/0266141 A1 | 11/2006 | Ogami |
| 2006/0266144 A1 | 11/2006 | Schafer et al. |
| 2007/0199393 A1 | 8/2007 | Hattori |
| 2010/0125020 A1 | 5/2010 | Ikegami et al. |
| 2011/0023638 A1 | 2/2011 | Mohlin et al. |
| 2012/0115677 A1* | 5/2012 | Sakai .................... B60K 6/387 477/5 |

FOREIGN PATENT DOCUMENTS

| | | |
|---|---|---|
| JP | 2010-285012 A | 12/2010 |
| JP | 2011-240855 A | 12/2011 |
| KR | 10-2005-0115639 A | 12/2005 |

* cited by examiner

| Speed | CL1 | CL2 | CL3 | SL1 | | SL2 | | SL3 | | SL4 | | Note |
|---|---|---|---|---|---|---|---|---|---|---|---|---|
| | | | | 1st | 5th | 2nd | 4th | 3rd | 7th | 6th | R | |
| Reverse speed | | ● | | | | | | | | | ● | Engine ON |
| Neutral | | | | ● | | | | | | | | |
| D1 | ● | | ● | ● | | | | | | | | |
| D2 | | ● | | | | ● | | | | | | |
| D3 | ● | ● | | | | | | ● | | | | |
| D4 | | ● | | | | | ● | | | | | |
| D5 | ● | | ● | | ● | | | | | | | |
| D6 | | ● | | | | | | | | ● | | |
| D7 | ● | | ● | | | | | | ● | | | |
| HEV D1 | ● | | | ● | | | | | | | | Engine ON, motor ON |
| HEV D2 | ● | | | | | | | ● | | | | |
| HEV D3 | ● | | | | ● | | | | | | | |
| HEV D4 | ● | | | | | | | | ● | | | |
| EV D1 | | | ● | ● | | | | | | ● | | Engine OFF, motor ON |
| EV D2 | | | ● | | | | | ● | | | | |
| EV D3 | | | ● | | ● | | | | | | | |
| EV D4 | | | ● | | | | | | ● | | | |

US 9,593,768 B2

POWER TRANSMISSION APPARATUS FOR HYBRID ELECTRIC VEHICLE

CROSS-REFERENCE TO RELATED APPLICATION

The present application claims priority to and the benefit of Korean Patent Application No. 10-2013-0158816 filed on Dec. 18, 2013, the entire contents of which is incorporated herein for all purposes by this reference.

BACKGROUND OF THE INVENTION

Field of the Invention

The present invention relates to a power transmitting apparatus for a vehicle. More particularly, the present invention relates to a power transmitting apparatus for a vehicle that realizes smooth start and quick shift by adding a motor/generator and a planetary gear set to a double clutch transmission motor/generator and improves fuel economy by realizing regenerative braking and start charging.

Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of realizing smooth start and quick shift by adding a motor/generator and a planetary gear set to a double clutch transmission motor/generator and improving fuel economy by realizing regenerative braking and start charging.

A power transmitting apparatus for a vehicle according to an aspect of the present invention may further include a first input shaft adapted to selectively receive torque of an engine, a second input shaft disposed without rotational interference with the first input shaft, adapted to selectively receive the torque of the engine, and having at least one input gear fixedly disposed thereon, a third input shaft disposed in a row with the second input shaft and without rotational interference with the first input shaft, and having at least one input gear fixedly disposed thereon, a motor/generator operated as a motor or a generator, a planetary gear set including a first rotation element directly connected to the motor/generator, a second rotation element directly connected to the third input shaft, and a third rotation element directly connected to the first input shaft, a first speed output unit adapted to convert torque input from the second input shaft or the third input shaft and output the converted torque, and a second speed output unit adapted to convert torque input from the second input shaft or the third input shaft and output the converted torque.

At least one input gear fixedly disposed on the second input shaft may be related to achieving even-numbered speeds including a reverse speed, and at least one input gear fixedly disposed on the third input shaft may be related to achieving odd-numbered speeds.

A first input gear for achieving a reverse speed or a second forward speed and a second input gear for achieving a fourth forward speed or a sixth forward speed may be fixedly disposed on the second input shaft, and a third input gear for achieving a seventh forward speed, a fourth input gear for achieving a first forward speed, a fifth input gear for achieving a third forward speed, and a sixth input gear for achieving a fifth forward speed may be fixedly disposed on the third input shaft.

The power transmitting apparatus may further include a first clutch selectively connecting the engine to the first input shaft, and a second clutch selectively connecting the engine to the second input shaft.

The planetary gear set may be a double pinion planetary gear set, wherein the first rotation element is a sun gear, the second rotation element is a ring gear, and the third rotation element is a planet carrier.

The power transmitting apparatus may further include a third clutch selectively connecting two rotation elements among the first, second and third rotation elements of the planetary gear set.

The first speed output unit may further include a first output shaft disposed in parallel with the second and third input shafts, a first output gear fixedly disposed on the first output shaft and outputting torque of the first output shaft, first, second, fourth, and fifth speed gears rotatably disposed on the first output shaft, a first synchronizer selectively connecting the first speed gear or the fifth speed gear to the first output shaft, and a second synchronizer selectively connecting the second speed gear or the fourth speed gear to the first output shaft.

The first speed gear may be engaged with the fourth input gear, the second speed gear may be engaged with the first input gear, the fourth speed gear may be engaged with the second input gear, and the fifth speed gear may be engaged with the sixth input gear.

The second speed output unit may further include a second output shaft disposed in parallel with the second and third input shafts, a second output gear fixedly disposed on the second output shaft and outputting torque of the second output shaft, third, sixth, and seventh speed gears and reverse speed gear rotatably disposed on the second output shaft, a third synchronizer selectively connecting the third speed gear or the seventh speed gear to the second output shaft, and a fourth synchronizer selectively connecting the sixth speed gear or the reverse speed gear to the second output shaft.

The power transmitting apparatus may further include a reverse speed idle device operably connecting the reverse speed gear to the first input gear, wherein the third speed gear is engaged with the fifth input gear, the sixth speed gear is engaged with the second input gear, and the seventh speed gear is engaged with the third input gear.

The reverse speed idle device may further include an idle shaft disposed in parallel with the second input shaft, a reverse speed input gear engaged with the first input gear, and a reverse speed output gear engaged with the reverse speed gear.

Each of the second input shaft and the third input shaft may be a hollow shaft, and the first input shaft may penetrate simultaneously through the second input shaft and the third input shaft.

A power transmitting apparatus for a vehicle according to another exemplary embodiment of the present invention may further include a first input shaft adapted to selectively receive torque of an engine, a second input shaft disposed without rotational interference with the first input shaft, adapted to selectively receive the torque of the engine, and having at least one input gear fixedly disposed thereon, a third input shaft disposed in a row with the second input shaft and without rotational interference with the first input shaft, and having at least one input gear fixedly disposed thereon, a motor/generator operated as a motor or a generator, a planetary gear set including a first rotation element directly connected to the motor/generator, a second rotation element directly connected to the third input shaft, and a third rotation element directly connected to the first input shaft, a first clutch selectively connecting the engine to the first input shaft, a second clutch selectively connecting the engine to the second input shaft, a first speed output unit adapted to convert torque input from the second input shaft or the third input shaft and output the converted torque, and a second speed output unit adapted to convert torque input from the second input shaft or the third input shaft and output the converted torque.

A first input gear for achieving a reverse speed or a second forward speed and a second input gear for achieving a fourth forward speed or a sixth forward speed may be fixedly disposed on the second input shaft, and a third input gear for achieving a seventh forward speed, a fourth input gear for achieving a first forward speed, a fifth input gear for achieving a third forward speed, and a sixth input gear for achieving a fifth forward speed may be fixedly disposed on the third input shaft.

The planetary gear set may be a double pinion planetary gear set, wherein the first rotation element is a sun gear, the second rotation element is a ring gear, and the third rotation element is a planet carrier.

The power transmitting apparatus may further include a third clutch selectively connecting two rotation elements among the first, second and third elements of the planetary gear set.

The first speed output unit may include a first output shaft disposed in parallel with the second and third input shafts, a first output gear fixedly disposed on the first output shaft and outputting torque of the first output shaft, first, second, fourth, and fifth speed gears rotatably disposed on the first output shaft, a first synchronizer selectively connecting the first speed gear or the fifth speed gear to the first output shaft, and a second synchronizer selectively connecting the second speed gear or the fourth speed gear to the first output shaft.

The first speed gear may be engaged with the fourth input gear, the second speed gear may be engaged with the first input gear, the fourth speed gear may be engaged with the second input gear, and the fifth speed gear may be engaged with the sixth input gear.

The second speed output unit may include a second output shaft disposed in parallel with the second and third input shafts, a second output gear fixedly disposed on the second output shaft and outputting torque of the second output shaft, third, sixth, and seventh speed gears and reverse speed gear rotatably disposed on the second output shaft, a third synchronizer selectively connecting the third speed gear or the seventh speed gear to the second output shaft, and a fourth synchronizer selectively connecting the sixth speed gear or the reverse speed gear to the second output shaft.

The power transmitting apparatus may further include a reverse speed idle device operably connecting the reverse speed gear to the first input gear, wherein the third speed gear is engaged with the fifth input gear, the sixth speed gear is engaged with the second input gear, and the seventh speed gear is engaged with the third input gear.

The reverse speed idle device may include: an idle shaft disposed in parallel with the second input shaft; a reverse speed input gear engaged with the first input gear; and a reverse speed output gear engaged with the reverse speed gear.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
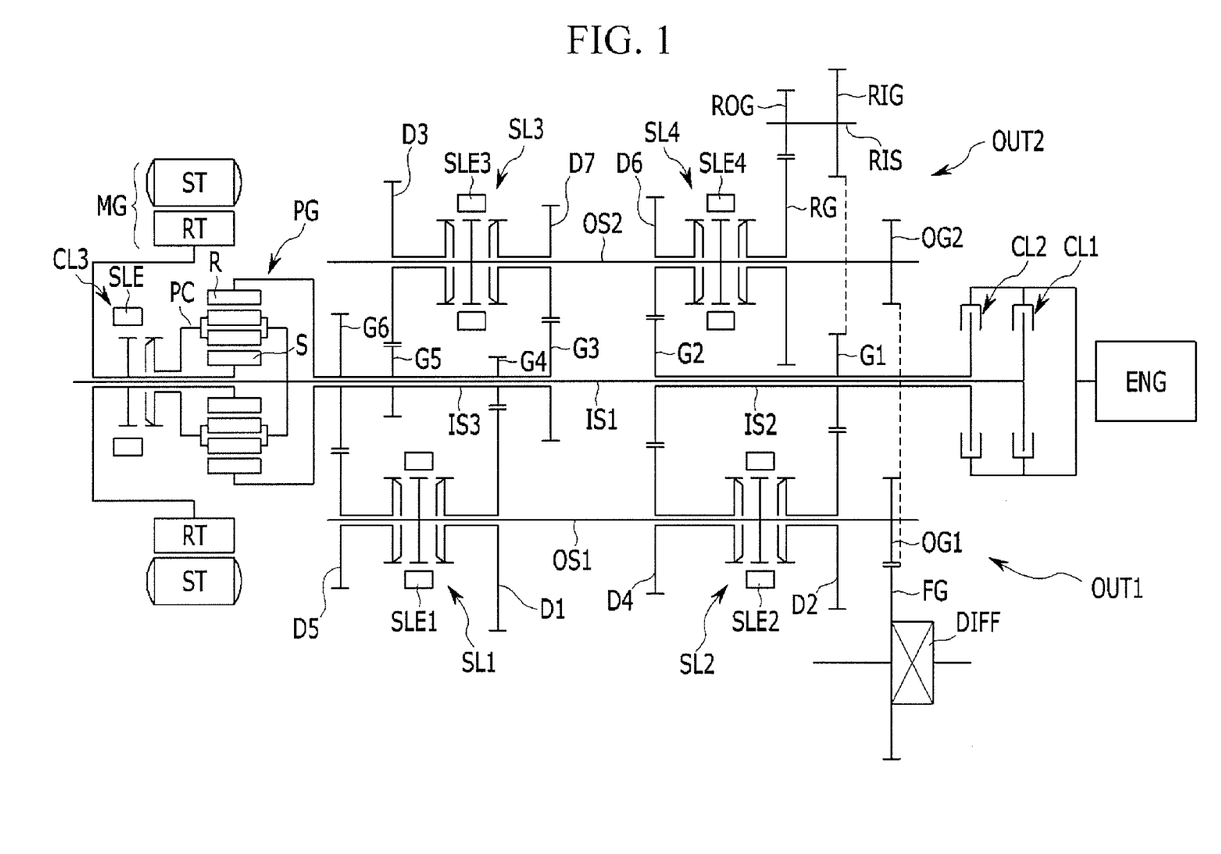
FIG. 1 is a schematic diagram of a power transmitting apparatus according to an exemplary embodiment of the present invention.

FIG. 1 is a schematic diagram of a power transmitting apparatus according to an exemplary embodiment of the present invention.

Referring to FIG. 1, a power transmitting apparatus according to an exemplary embodiment of the present invention includes first, second, and third input shafts IS1, IS2, and IS3, first, second, and third clutches CL1, CL2, and CL3, a planetary gear set PG, a motor/generator MG, and first and second speed output units OUT1 and OUT2.

The first input shaft IS1 is selectively connected to an output side of an engine ENG.

The second input shaft IS2 is a hollow shaft and is disposed at a side portion of the first input shaft IS1 without rotational interference therebetween. The second input shaft IS2 is selectively connected to the output side of the engine ENG.

The third input shaft IS3 is a hollow shaft and is disposed at the other side portion of the first input shaft IS1 without rotational interference therebetween.

First and second input gears G1 and G2 are sequentially disposed on the second input shaft IS2 from a side portion to the other side portion, and third, fourth, fifth, and sixth input gears G3, G4, G5, and G6 are sequentially disposed on the third input shaft IS3 from a side portion to the other side portion.

The first, second, third, fourth, fifth, and sixth input gears G1, G2, G3, G4, G5, and G6 are input gears operating at each speed. That is, the first input gear G1 is an input gear for achieving a reverse speed and a second forward speed, the second input gear G2 is an input gear for achieving a fourth forward speed and a sixth forward speed, the third input gear G3 is an input gear for achieving a seventh forward speed, the fourth input gear G4 is an input gear for achieving a first forward speed, the fifth input gear G5 is an input gear for achieving a third forward speed, and the sixth input gear G6 is an input gear for achieving a fifth forward speed.

Here, input gears for achieving the reverse speed and even-numbered speeds are disposed on the second input shaft IS2, and input gears for achieving odd-numbered speeds are disposed on the third input shaft IS3.

The first clutch CL1 is disposed between the output side of the engine ENG and the first input shaft IS1 and selectively connects the first input shaft IS1 to the output side of the engine ENG. The second clutch CL2 is disposed between the output side of the engine ENG and the second input shaft IS2 and selectively connects the second input shaft IS2 to the output side of the engine ENG.

The first and second clutches CL1 and CL2 are conventional multi-plate clutches of wet type and may be controlled by a hydraulic control system.

The planetary gear set PG includes first, second, and third rotation elements. The first rotation element is directly connected to the motor/generator MG, the second rotation element is directly connected to the third input shaft IS3, and the third rotation element is directly connected to the first input shaft IS1.

For example, the planetary gear set PG may be a double pinion planetary gear set, wherein the first rotation element is a sun gear S, the second rotation element is a ring gear R, and the third rotation element is a planet carrier PC.

The third clutch CL3 may be disposed at the other side of the planetary gear set PG and may be a typical synchronizer. The third clutch CL3 selectively connects the sun gear S being the first rotation element and the planet carrier PC being the third rotation element so as to cause the planetary gear set PG to become a direct-coupling state.

Since the third clutch CL3 is well known to a person of an ordinary skill in the art, detailed description thereof will be omitted. In addition, a sleeve SLE applied to the synchronizer, as well known to a person of an ordinary skill in the art, is operated by an additional actuator and the actuator is controlled by a transmission control unit.

The third clutch CL3 may not be a synchronizer and may be a dog clutch or a multi-plates clutch.

The motor/generator MG can be operated as a motor or a generator, and includes a stator ST fixed to a transmission housing and a rotor RT rotatably supported in the stator ST. The rotor RT is directly connected to the sun gear S that is the first rotation element of the planetary gear set PG.

Therefore, the motor/generator MG may be operated as the generator using torque of the engine ENG and may charge a battery by generated electrical energy, or may be operated as the motor for generating driving torque.

The first speed output unit OUT1 includes a first output shaft OS1 disposed in parallel with and apart from the second and third input shafts IS2 and IS3, first, second, fourth, and fifth speed gears D1, D2, D4, and D5, a first output gear OG1 fixedly disposed on the first output shaft OS1 and outputting torque of the first output shaft OS1, a first synchronizer SL1 selectively connecting the first speed gear D1 or the fifth speed gear D5 to the first output shaft OS1, and a second synchronizer SL2 selectively connecting the second speed gear D2 or the fourth speed gear D4 to the first output shaft OS1.

The first synchronizer SL1 is disposed at a side portion of the first output shaft OS1 and the second synchronizer SL2 is disposed at the other side portion of the first output shaft OS1.

The first speed gear D1 is engaged with the fourth input gear G4 and the fifth speed gear D5 is engaged with the sixth input gear G6.

The second speed gear D2 is engaged with the first input gear G1 and the fourth speed gear D4 is engaged with the second input gear G2.

In addition, the torque converted by the first speed output unit OUT1 is transmitted to a differential apparatus DIFF through the first output gear OG1 fixedly disposed on one end portion or the other end portion of the first output shaft OS1 and a final reduction gear FG engaged with the first output gear OG1.

The second speed output unit OUT2 includes a second output shaft OS2 disposed in parallel with and apart from the second and third input shafts IS2 and IS3, a second output gear OG2 fixedly disposed on the second output shaft OS2 and outputting torque of the second output shaft OS2, third, sixth, and seventh speed gears D3, D6, and D7 and a reverse speed gear RG, a third synchronizer SL3 selectively connecting the third speed gear D3 or the seventh speed gear D7 to the second output shaft OS2, and a fourth synchronizer SL4 selectively connecting the sixth speed gear D6 or the reverse speed gear RG to the second output shaft OS2.

The third synchronizer SL3 is disposed at a side portion of the second output shaft OS2 and the fourth synchronizer SL4 is disposed at the other side portion of the second output shaft OS2.

The third speed gear D3 is engaged with the fifth input gear G5 and the seventh speed gear D7 is engaged with the third input gear G3.

The sixth speed gear D6 is engaged with the second input gear G2 and the reverse speed gear RG is connected to a reverse speed idle device.

In addition, the torque converted by the second speed output unit OUT2 is transmitted to the differential apparatus DIFF through the second output gear OG2 fixedly disposed on one end portion or the other end portion of the second output shaft IS2 and the final reduction gear FD engaged with the second output gear OG2.

Since the first, second, third, and fourth synchronizers SL1, SL2, SL3, and SL4 are well known to a person of an ordinary skill in the art, detailed description thereof will be omitted. In addition, sleeves SLE1, SLE2, SLE3, and SLE4 applied respectively to the first, second, third, and fourth synchronizers SL1, SL2, SL3, and SL4, as well known to a person of an ordinary skill in the art, are operated by additional actuators and the actuators are controlled by a transmission control unit.

The reverse speed idle device includes an idle shaft RIS disposed in parallel with the second input shaft IS2, a reverse speed input gear RIG fixedly disposed at one side portion of the idle shaft RIS and engaged with the first input gear G1, and a reverse speed output gear ROG fixedly disposed at the other side portion of the idle shaft RIS and engaged with the reverse speed gear RG.

Therefore, torque transmitted from the first input gear G1 on the second input shaft IS2 is transmitted to the reverse speed gear RG without change of rotational direction. Therefore, the reverse speed can be achieved.

Figure 2:
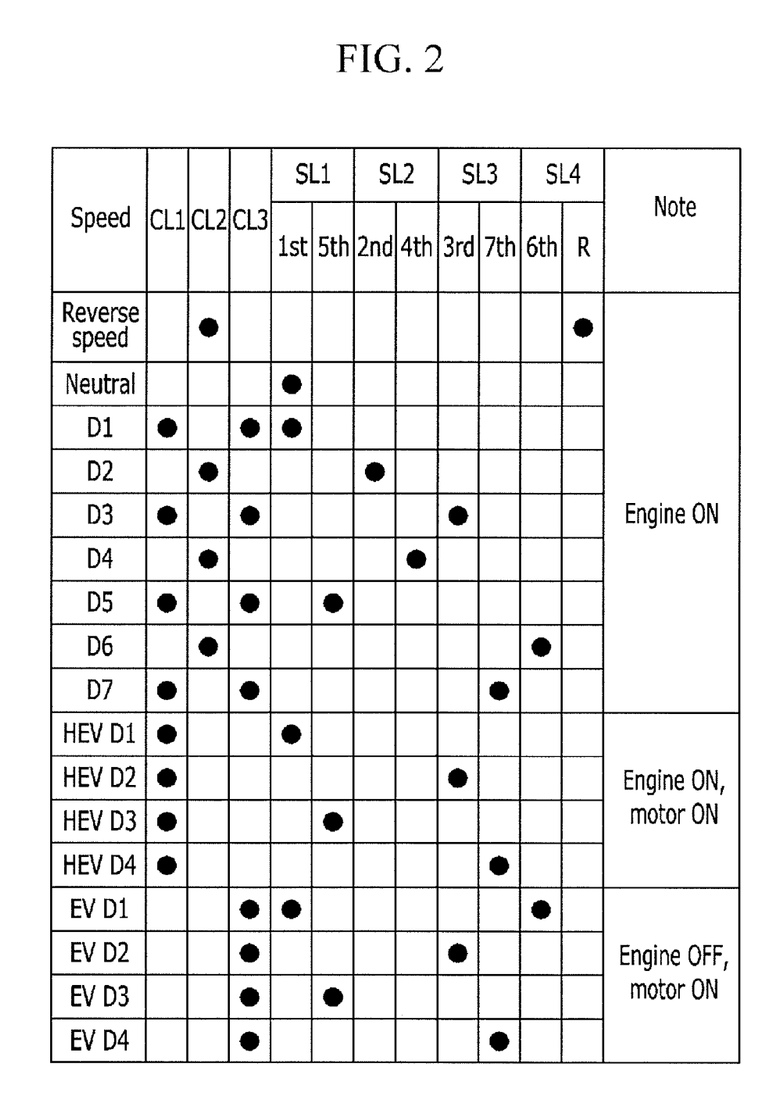
FIG. 2 is an operational chart of a power transmitting apparatus according to an exemplary embodiment of the present invention.

FIG. 2 is an operational chart of a power transmitting apparatus according to an exemplary embodiment of the present invention.

[Reverse Speed]

After the second output shaft OS2 and the reverse speed gear RG are operably connected through the fourth sleeve SLE4 of the fourth synchronizer SL4 in a state that the engine is started, the second clutch CL2 is operated at the reverse speed. Therefore, the reverse speed is achieved.

In this case, the torque of the engine ENG is transmitted to the final reduction gear FG through the second clutch CL2, the second input shaft IS2, the first input gear G1, the reverse speed input gear RIG, the idle shaft RIS, the reverse speed output gear ROG, the reverse speed gear RG, the second output shaft OS2, and the second output gear OG2.

[First Forward Speed]

The vehicle is driven by the torque of the engine ENG at the first forward speed. After the first speed gear D1 and the first output shaft OS1 are operably connected through the first sleeve SLE1 of the first synchronizer SL1, the first and third clutches CL1 and CL3 are operated. Therefore, the first forward speed is achieved.

In this case, the torque of the engine ENG is transmitted to the final reduction gear FG through the first clutch CL1, the first input shaft IS1, the third clutch CL3, the planetary gear set PG, the third input shaft IS3, the fourth input gear G4, the first speed gear D1, the first output shaft OS1, and the first output gear OG1.

After the shift to the first forward speed is completed, the second speed gear D2 and the first output shaft OS1 are operably connected by the sleeve SLE2 of the second synchronizer SL2 for a shift to the second forward speed.

[Second Forward Speed]

If a vehicle speed increases at the first forward speed and the shift to the second forward speed is necessary, the first clutch CL1 and the third clutch CL3 are released and the second clutch CL2 is operated.

As described above, in a state that the second speed gear D2 and the first output shaft OS1 are operably connected by the second sleeve SLE2 of the second synchronizer SL2 at the first forward speed, the torque of the engine ENG is transmitted to the final reduction gear FG through the second clutch CL2, the second input shaft IS2, the first input gear G1, the second speed gear D2, the first output shaft OS1, and the first output gear OG1.

After the shift to the second forward speed is completed, the first sleeve SLE1 of the first synchronizer SL1 moves to a neutral position, and the third speed gear D3 and the second output shaft OS2 are operably connected by the third sleeve SLE3 of the third synchronizer SL3 for a shift to the third forward speed.

[Third Forward Speed]

If the vehicle speed increases at the second forward speed and the shift to the third forward speed is necessary, the second clutch CL2 is released and the first and third clutches CL1 and CL3 are operated.

As described above, in a state that the third speed gear D3 and the second output shaft OS2 are operably connected by the third sleeve SLE3 of the third synchronizer SL3 at the second forward speed, the torque of the engine ENG is transmitted to the final reduction gear FG through the first clutch CL1, the first input shaft IS1, the third clutch CL3, the planetary gear set PG, the third input shaft IS3, the fifth input gear G5, the third speed gear D3, the second output shaft OS2, and the second output gear OG2.

After the shift to the third forward speed is completed, the second sleeve SLE2 of the second synchronizer SL2 moves to a neutral position, the fourth speed gear D4 and the first output shaft OS1 are operably connected by the second sleeve SLE2 of the second synchronizer SL2 for a shift to the fourth forward speed.

[Fourth Forward Speed]

If the vehicle speed increases at the third forward speed and the shift to the fourth forward speed is necessary, the first clutch CL1 and the third clutch CL3 are released and the second clutch CL2 is operated.

As described above, in a state that the fourth speed gear D4 and the first output shaft OS1 are operably connected by the second sleeve SLE2 of the second synchronizer SL2 at the third forward speed, the torque of the engine ENG is transmitted to the final reduction gear FG through the second clutch CL2, the second input shaft IS2, the second input gear G2, the fourth speed gear D4, the first output shaft OS1, and the first output gear OG1.

After the shift to the fourth forward speed is completed, the third sleeve SLE3 of the third synchronizer SL3 moves to a neutral position, and the fifth speed gear D5 and the first output shaft OS1 are operably connected by the first sleeve SLE1 of the first synchronizer SL1 for a shift to the fifth forward speed.

[Fifth Forward Speed]

If the vehicle speed increases at the fourth forward speed and the shift to the fifth forward speed is necessary, the second clutch CL2 is released and the first clutch CL1 and the third clutch CL3 are operated.

As described above, in a state that the fifth speed gear D5 and the first output shaft OS1 are operably connected by the first sleeve SLE1 of the first synchronizer SL1 at the fourth forward speed, the torque of the engine ENG is transmitted to the final reduction gear FG through the first clutch CL1, the first input shaft IS1, the third clutch CL3, the planetary gear set PG, the third input shaft IS3, the sixth input gear G6, the fifth speed gear D5, the first output shaft OS1, and the first output gear OG1.

After the shift to the fifth forward speed is completed, the second sleeve SLE2 of the second synchronizer SL2 moves to the neutral position, and the sixth speed gear D6 and the second output shaft OS2 are operably connected by the fourth sleeve SLE4 of the fourth synchronizer SL4 for a shift to the sixth forward speed.

[Sixth Forward Speed]

If the vehicle speed increases at the fifth forward speed and the shift to the sixth forward speed is necessary, the first clutch CL1 and the third clutch CL3 are released and the second clutch CL2 is operated.

As described above, in a state that the sixth speed gear D6 and the second output shaft OS2 are operably connected by the fourth sleeve SLE4 of the fourth synchronizer SL4 at the fifth forward speed, the torque of the engine ENG is transmitted to the final reduction gear FG through the second clutch CL2, the second input shaft IS2, the second input gear G2, the sixth speed gear D6, the second output shaft OS2, and the second output gear OG2.

After the shift to the sixth forward speed is completed, the first sleeve SLE1 of the first synchronizer SL1 moves to the neutral position, and the seventh speed gear D7 and the second output shaft OS2 are operably connected by the third sleeve SLE3 of the third synchronizer SL3 for a shift to the seventh forward speed.

[Seventh Forward Speed]

If the vehicle speed increases at the sixth forward speed and the shift to the seventh forward speed is necessary, the second clutch CL2 is released and the first clutch CL1 and the third clutch CL3 are operated.

As described above, in a state that the seventh speed gear D7 and the second output shaft OS2 are operably connected by the third sleeve SLE3 of the third synchronizer SL3 at the sixth forward speed, the torque of the engine ENG is transmitted to the final reduction gear FG through the first clutch CL1, the first input shaft IS1, the third clutch CL3, the planetary gear set PG, the third input shaft IS3, the third input gear G3, the seventh speed gear D7, the second output shaft OS2, and the second output gear OG2.

After the shift to the sixth forward speed is completed, the fourth sleeve SLE4 of the fourth synchronizer SL4 moves to a neutral position.

The shift processes are illustrated when speed rises sequentially. If speed lowers sequentially, shift processes are performed in an inverse manner.

Meanwhile, the driving torque of the motor/generator MG may be used to assist the engine ENG. In addition, since the rotor RT of the motor/generator MG is always rotated at the odd-numbered speeds when the vehicle runs by the torque of the engine ENG, the motor/generator MG is operated as the generator and electrical energy generated by the motor/generator MG is used to charge a battery.

In addition, the power transmitting apparatus according to the exemplary embodiment of the present invention can achieve four forward speeds at a hybrid electric vehicle (HEV) mode.

Since both of the engine ENG and the motor/generator MG are operated at the HEV mode, a shift to a speed related to the third input shaft IS3 is possible.

Therefore, the first forward speed is achieved as a first HEV speed, the third forward speed is achieved as a second HEV speed, the fifth forward speed is achieved as a third HEV speed, and the seventh forward speed is achieved as a fourth HEV speed.

At this time, the second clutch CL2 and the third clutch CL3 are released and the first clutch CL1 is operated.

In this case, the torque of the engine ENG and the torque of the motor/generator MG are input to the planetary gear set PG, and the torques of the engine ENG and the motor/generator MG are transmitted to the third input shaft IS3.

In addition, the power transmitting apparatus according to the exemplary embodiment of the present invention can achieve four forward speeds at an electric vehicle (EV) mode.

Since the vehicle is driven only by the torque of the motor/generator MG at the EV mode, a shift to a speed related to the third input shaft IS3 is possible.

Therefore, the first forward speed is achieved as a first EV speed, the third forward speed is achieved as a second EV speed, the fifth forward speed is achieved as a third EV speed, and the seventh forward speed is achieved as a fourth EV speed. At this time, the third clutch CL3 is operated.

Therefore, the planetary gear set PG becomes the direct-coupling state and the torque of the motor/generator MG is transmitted to the third input shaft IS3.

When the battery is charged by using the torque of the engine at the neutral, the first speed gear D1 and the first output shaft OS1 are operably connected by the first sleeve SLE1 of the first synchronizer SL1 and the first clutch CL1 is operated.

In this case, the torque of the engine ENG is input to the planet carrier PC through the first input shaft IS1 and the ring gear R is operated as a fixed element by the third input shaft IS3. Therefore, rotation speed of the sun gear S is faster than that of the engine ENG and the motor/generator MG is operated as the generator. In addition, electrical energy generated by the motor/generator MG is used to charge a battery.

The power transmitting apparatus for a vehicle according to the exemplary embodiment of the present invention can achieve seven forward speeds and one reverse speed by the torque of the engine, four forward speeds at the HEV mode by the torques of the engine and the motor/generator, and four forward speeds at the EV mode by the torque of the motor/generator. Therefore, fuel economy may be enhanced.

In addition, smooth starting may be performed without slip of friction members by the engine and the motor/generator connected respectively to rotation elements of the planetary gear set. In addition, starting is possible only by the motor/generator in a state that the engine is stopped.

In addition, when the vehicle runs by the torque of the engine, the motor/generator can supply auxiliary torque. Therefore, acceleration performance may be improved.

In addition, since the rotor of the motor/generator is always rotated at the odd-numbered speeds, the motor/generator is operated as the generator so as to generate electrical energy and charge the battery.

In addition, braking force may be regenerated as electric energy at the odd-numbered speeds.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmitting apparatus for a vehicle comprising:
    a first input shaft adapted to selectively receive torque of an engine;
    a second input shaft disposed without rotational interference with the first input shaft, adapted to selectively receive the torque of the engine, and having at least one input gear fixedly disposed thereon;
    a third input shaft disposed in a row with the second input shaft, and having at least one input gear fixedly disposed thereon;
    a motor/generator operated as a motor or a generator;
    a planetary gear set including a first rotation element directly connected to the motor/generator, a second rotation element directly connected to the third input shaft, and a third rotation element directly connected to the first input shaft;
    a first speed output shaft adapted to convert torque input from the second input shaft or the third input shaft and output a converted torque; and
    a second speed output shaft adapted to convert torque input from the second input shaft or the third input shaft and output a converted torque,
    wherein a first input gear for achieving a reverse speed or a second forward speed and a second input gear for achieving a fourth forward speed or a sixth forward speed are fixedly disposed on the second input shaft, and
    wherein a third input gear for achieving a seventh forward speed, a fourth input gear for achieving a first forward speed, a fifth input gear for achieving a third forward speed, and a sixth input gear for achieving a fifth forward speed are fixedly disposed on the third input shaft.

2. The power transmitting apparatus of claim 1, further comprising:
    a first clutch selectively connecting the engine to the first input shaft; and
    a second clutch selectively connecting the engine to the second input shaft.

3. The power transmitting apparatus of claim 1, wherein the planetary gear set is a double pinion planetary gear set, wherein the first rotation element is a sun gear, the second rotation element is a ring gear, and the third rotation element is a planet carrier.

4. The power transmitting apparatus of claim 1, further comprising a third clutch selectively connecting two rotation elements among the first, second and third rotation elements of the planetary gear set.

5. The power transmitting apparatus of claim 1, wherein:
    the first output shaft is disposed in parallel with the second and third input shafts;
    a first output gear fixedly is disposed on the first output shaft and outputs torque of the first output shaft;
    first, second, fourth, and fifth speed gears are rotatably disposed on the first output shaft;
    a first synchronizer selectively connects the first speed gear or the fifth speed gear to the first output shaft; and
    a second synchronizer selectively connects the second speed gear or the fourth speed gear to the first output shaft.

6. The power transmitting apparatus of claim 5, wherein the first speed gear is engaged with the fourth input gear, the second speed gear is engaged with the first input gear, the fourth speed gear is engaged with the second input gear, and the fifth speed gear is engaged with the sixth input gear.

7. The power transmitting apparatus of claim 1, wherein the second speed output unit comprises:
    the second output shaft disposed in parallel with the second and third input shafts;
    a second output gear fixedly disposed on the second output shaft and outputting torque of the second output shaft;
    third, sixth, and seventh speed gears and reverse speed gear rotatably disposed on the second output shaft;
    a third synchronizer selectively connecting the third speed gear or the seventh speed gear to the second output shaft; and
    a fourth synchronizer selectively connecting the sixth speed gear or the reverse speed gear to the second output shaft.

8. The power transmitting apparatus of claim 7, further comprising a reverse speed idle device operably connecting the reverse speed gear to the first input gear,
    wherein the third speed gear is engaged with the fifth input gear, the sixth speed gear is engaged with the second input gear, and the seventh speed gear is engaged with the third input gear.

9. The power transmitting apparatus of claim 8, wherein the reverse speed idle device comprises:
    an idle shaft disposed in parallel with the second input shaft;
    a reverse speed input gear engaged with the first input gear; and
    a reverse speed output gear engaged with the reverse speed gear.

10. The power transmitting apparatus of claim 1,
wherein each of the second input shaft and the third input shaft is a hollow shaft, and
wherein the first input shaft penetrates simultaneously through the second input shaft and the third input shaft.

11. A power transmitting apparatus for a vehicle comprising:
a first input shaft adapted to selectively receive torque of an engine;
a second input shaft disposed without rotational interference with the first input shaft, adapted to selectively receive the torque of the engine, and having at least one input gear fixedly disposed thereon;
a third input shaft disposed in a row with the second input shaft, and having at least one input gear fixedly disposed thereon;
a motor/generator operated as a motor or a generator;
a planetary gear set including a first rotation element directly connected to the motor/generator, a second rotation element directly connected to the third input shaft, and a third rotation element directly connected to the first input shaft;
a first clutch selectively connecting the engine to the first input shaft;
a second clutch selectively connecting the engine to the second input shaft;
a first speed output shaft adapted to convert torque input from the second input shaft or the third input shaft and output a converted torque; and
a second speed output shaft adapted to convert torque input from the second input shaft or the third input shaft and output a converted torque,
wherein a first input gear for achieving a reverse speed or a second forward speed and a second input gear for achieving a fourth forward speed or a sixth forward speed are fixedly disposed on the second input shaft, and
wherein a third input gear for achieving a seventh forward speed, a fourth input gear for achieving a first forward speed, a fifth input gear for achieving a third forward speed, and a sixth input gear for achieving a fifth forward speed are fixedly disposed on the third input shaft.

12. The power transmitting apparatus of claim 11, wherein the planetary gear set is a double pinion planetary gear set, wherein the first rotation element is a sun gear, the second rotation element is a ring gear, and the third rotation element is a planet carrier.

13. The power transmitting apparatus of claim 11, further comprising a third clutch selectively connecting two rotation elements among the first, second, and third rotation elements of the planetary gear set.

14. The power transmitting apparatus of claim 11, wherein:
the first output shaft is disposed in parallel with the second and third input shafts;
a first output gear fixedly is disposed on the first output shaft and outputs torque of the first output shaft;
first, second, fourth, and fifth speed gears are rotatably disposed on the first output shaft;
a first synchronizer selectively connects the first speed gear or the fifth speed gear to the first output shaft; and
a second synchronizer selectively connects the second speed gear or the fourth speed gear to the first output shaft.

15. The power transmitting apparatus of claim 14, wherein the first speed gear is engaged with the fourth input gear, the second speed gear is engaged with the first input gear, the fourth speed gear is engaged with the second input gear, and the fifth speed gear is engaged with the sixth input gear.

16. The power transmitting apparatus of claim 11, wherein the second speed output unit comprises:
the second output shaft disposed in parallel with the second and third input shafts;
a second output gear fixedly disposed on the second output shaft and outputting torque of the second output shaft;
third, sixth, and seventh speed gears and reverse speed gear rotatably disposed on the second output shaft;
a third synchronizer selectively connecting the third speed gear or the seventh speed gear to the second output shaft; and
a fourth synchronizer selectively connecting the sixth speed gear or the reverse speed gear to the second output shaft.

17. The power transmitting apparatus of claim 16, further comprising a reverse speed idle device operably connecting the reverse speed gear to the first input gear,
wherein the third speed gear is engaged with the fifth input gear, the sixth speed gear is engaged with the second input gear, and the seventh speed gear is engaged with the third input gear.

18. The power transmitting apparatus of claim 17, wherein the reverse speed idle device comprises:
an idle shaft disposed in parallel with the second input shaft;
a reverse speed input gear engaged with the first input gear; and
a reverse speed output gear engaged with the reverse speed gear.

* * * * *